United States Patent
Mitlin et al.

(10) Patent No.: US 10,788,818 B1
(45) Date of Patent: Sep. 29, 2020

(54) GENERIC MAINTENANCE ACTIVITY SCHEDULING

(71) Applicant: Amazon Technologies, Inc., Seattle, WA (US)

(72) Inventors: Anatoly Mitlin, Swampscott, MA (US); Aayush Aggarwal, Medford, MA (US); Sarfraz Banglawala, Wakefield, MA (US); Usha Kamat, Westford, MA (US); Charles C. Linton, Southborough, MA (US); Sean Edward Murray, Somerville, MA (US); John D. Pacheco, Merrimack, NH (US); James Plumley, Pelham, NH (US); Yuhao Qian, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 15/799,916

(22) Filed: Oct. 31, 2017

(51) Int. Cl.
| | |
|---|---|
| *G05B 19/418* | (2006.01) |
| *G06Q 10/06* | (2012.01) |
| *G06F 11/07* | (2006.01) |
| *G06Q 10/00* | (2012.01) |
| *G05D 1/02* | (2020.01) |

(52) U.S. Cl.
CPC ... *G05B 19/41895* (2013.01); *G05B 19/4185* (2013.01); *G05D 1/0291* (2013.01); *G05D 1/0297* (2013.01); *G06F 11/079* (2013.01); *G06Q 10/0633* (2013.01); *G06Q 10/063114* (2013.01); *G06Q 10/20* (2013.01); *G05B 2219/31004* (2013.01); *G05B 2219/31006* (2013.01); *G05B 2219/39153* (2013.01); *G05B 2219/40156* (2013.01);

(Continued)

(58) Field of Classification Search
CPC ......... G05D 2201/0216; G05D 1/0217; G05D 1/0225; G05D 1/0291; G05D 1/0297; G06F 11/079; G06Q 10/20; G06Q 10/08; G06Q 50/28; G05B 19/4189; G05B 19/41895; G05B 2219/31004; G05B 2219/34006; G05B 2219/40414; G05B 2219/40156; G05B 2219/40153; G05B 2219/39153
See application file for complete search history.

(56) References Cited

U.S. PATENT DOCUMENTS

| | | | |
|---|---|---|---|
| 8,280,547 | B2 | 10/2012 | D'Andrea et al. |
| 9,087,314 | B2 | 7/2015 | Hoffman et al. |

(Continued)

*Primary Examiner* — Spencer D Patton
(74) *Attorney, Agent, or Firm* — Kilpatrick Townsend & Stockton LLP

(57) ABSTRACT

A system for configuring generic maintenance activity scheduling is provided. For example, user input may help define a maintenance process for a plurality of mobile drive units of the physical workspace. The maintenance process may be defined through a configuration of activity templates and input templates. Input may be received to configure maintenance activities and the system may automatically correlate failure rules with the activity template. The system may generate the configurable electronic instructions for the mobile drive units and transmit them with the failure rules, if generated, to one or more mobile drive units of the physical workspace. When the one or more mobile device units receive the configurable electronic instruction, the mobile drive units may operate in accordance with the configurable electronic instruction.

20 Claims, 11 Drawing Sheets

(52) U.S. Cl.
CPC . *G05B 2219/40414* (2013.01); *G05D 1/0225* (2013.01); *G05D 2201/0216* (2013.01)

(56) References Cited

U.S. PATENT DOCUMENTS

| | | | |
|---|---|---|---|
| 2012/0143427 A1* | 6/2012 | Hoffman | G06Q 10/087 701/23 |
| 2018/0262466 A1* | 9/2018 | Atad | H04W 76/12 |
| 2019/0066407 A1* | 2/2019 | Kwak | G07C 5/008 |

* cited by examiner

GENERIC MAINTENANCE ACTIVITY SCHEDULING

BACKGROUND

As electronic systems become more ubiquitous, technical issues arise with maintaining these complex, electronic systems. For example, in modern inventory systems such as those in mail order warehouses, supply chain distribution centers, airport luggage systems, and custom-order manufacturing facilities, the electronic systems that run these modern inventory systems face significant challenges in responding to requests for inventory items, especially when the systems are not functioning properly. Thus, in many instances, the electronic systems may become inefficient when the electronics become out of date or are not functioning properly.

Several technical problems arise with these complex, electronic systems. For example, these systems may limit the ability of users to maintain mobile drive units in a physical warehouse and may delay the process for maintaining individual components of the mobile drive units, which is not straightforward and often requires specialized knowledge.

As a sample illustration, a single user may be tasked with maintaining these mobile drive units, even though other users with different specialties may not have access to maintaining these mobile drive units, despite their specialties. When the task of maintaining the mobile drive units comprises replacing specialized hardware or upgrading other components of the mobile drive units, the single user may be unable to provide efficient maintenance, thus causing the mobile drive units to be taken offline for a longer period of time than needed. This in turn decreases the throughput of the overall system.

BRIEF DESCRIPTION OF THE DRAWINGS

Various embodiments in accordance with the present disclosure will be described with reference to the drawings, in which.

DETAILED DESCRIPTION

Figure 1:
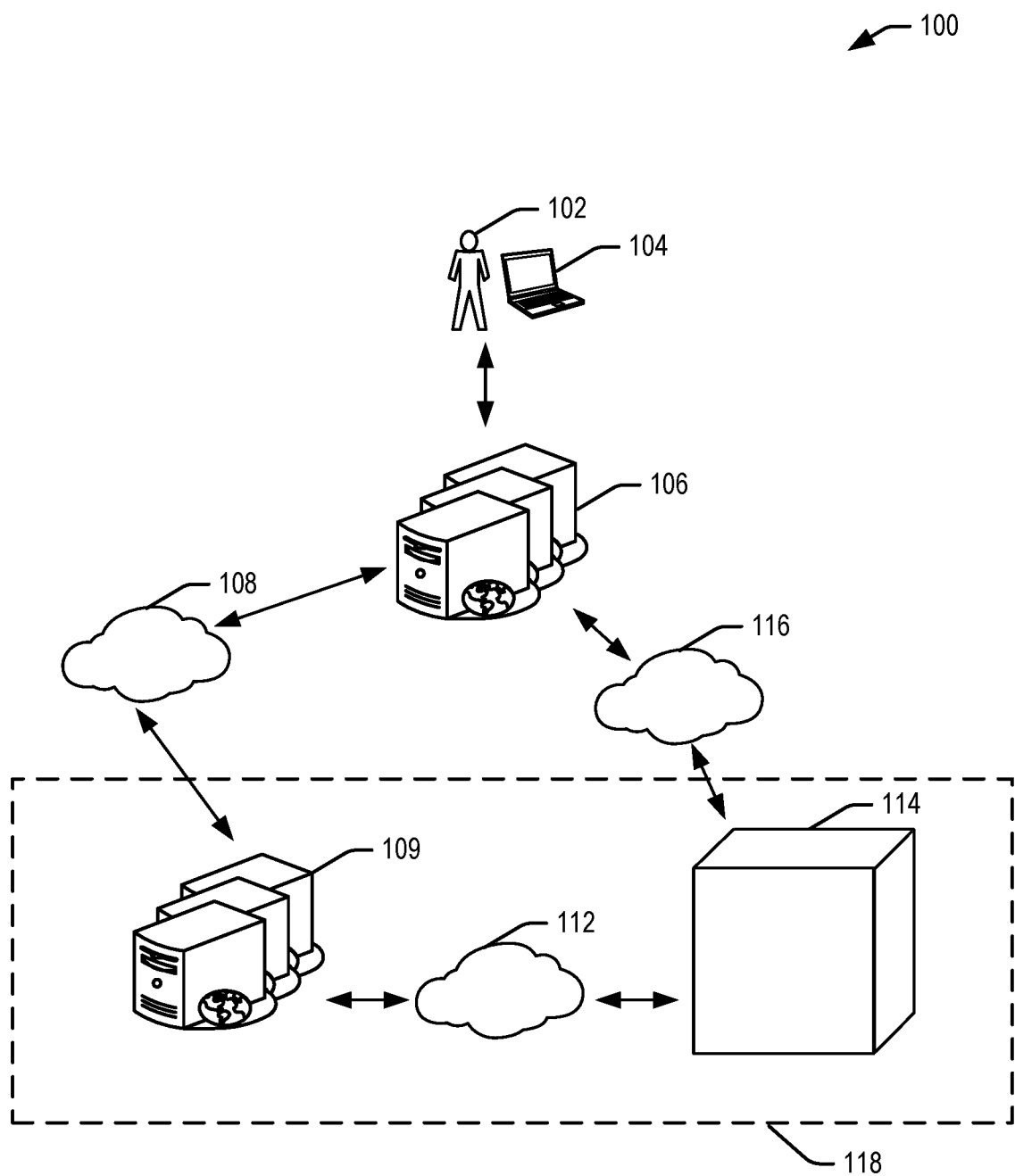
FIG. 1 illustrates an example architecture for providing generic maintenance activity scheduling described herein that includes a backend computing device, management module, and/or a mobile drive unit connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing generic maintenance activity scheduling. For example, a computing device may present a user interface that comprises a plurality of fields for accepting user input. The user input may help define a maintenance process for a plurality of mobile drive units of the physical workspace. In some examples, the maintenance process may be defined through a configuration of one or more activity templates and input templates. The computing device may receive first user input associated with the activity template and, in some examples, automatically correlate failure rules with the activity template based at least in part on the first user input. The computing device may also receive second user input associated with the input template. The second user input may correspond with particular mobile drive units, configuration settings, firmware information (e.g., firmware version), component upgrade information, calibration settings, or other information that may be used with the activity template to generate configurable electronic instructions. Once determined, the computing device may transmit a configurable electronic instruction and the failure rules, if generated, to one or more mobile drive units of the physical workspace. When the one or more mobile device units receive the configurable electronic instruction, the mobile drive units may operate in accordance with the configurable electronic instruction.

In an illustrative example, a server computer of the system provides a user interface with fields for the user to define a new maintenance activity template, input profile, view ongoing maintenance for the mobile drive units, or schedule feature maintenance for the mobile drive units. The user may select the option to generate a new maintenance activity template. In response, the system may display a user interface for accepting the definition and configurable settings of the activity template. The user may define one or more activities for the mobile drive unit. For example, the first activity may correspond with instructing the mobile drive unit to drive to a first location, the second activity may correspond with instructing the mobile drive unit to receive a firmware upgrade, and the third activity may correspond with instructing the mobile drive unit to return to its original location from the first location. These three activities may be associated with the activity template. The server computer may also receive a name or other identifier for the new activity template and store the new activity template in a data store.

The server computer may update the user interface to accept a new input profile through an input template. For example, continuing with this illustration, the user may access the maintenance activity template that it created and provide input for the created activity template. The input may correspond with particular mobile drive units that will receive the firmware upgrade according to the activity template or other information. The other information may comprise the version number of the firmware upgrade, an executable file associated with the firmware upgrade, a device that may perform the firmware upgrade, or other relevant information. In some examples, the information may be pre-filtered so that the user is only able to select input that is permissible by the system for the particular mobile drive unit or operation(s). The server computer may also receive a name or other identifier for the new input template and store the new input template in a data store.

Once the activity template and input template have been defined, the server computer may determine configurable electronic instructions that correspond with the identified input from the user. The computer may transmit the configurable electronic instruction to an on premise computer or management module in the physical warehouse, which may in turn transmit the configurable electronic instructions to one or more mobile drive units that are affected by the configurable electronic instructions from the server computer. In some examples, the computer may transmit the configurable electronic instruction directly to the mobile drive unit.

In continuing with the illustrative example, a mobile drive unit may receive the configurable instructions from the on premise computer or management module, or directly from the server computer via a communication network. The mobile drive unit may perform the operations according to the configurable electronic instruction. In some examples, the mobile drive unit may be operating in response to a different instruction when the configurable electronic instruction is received. The mobile drive unit may complete the current instruction and/or initiate the received configurable electronic instruction according to a ranking process of which instructions take precedence. The mobile drive unit, according to the input received from the user, may drive to the first location in the physical workspace, receive a firmware upgrade at the first location, and once the firmware upgrade is complete, the mobile drive unit may return to its original location to perform other operations (e.g., according to the three-step process defined in the activity template, etc.).

Embodiments of the disclosure provides several technical advantages over prior systems. For example, prior systems may limit the ability of users to generate configurable electronic instructions for mobile drive units in a physical warehouse. For example, in these prior systems, a single user may be tasked with providing instructions to mobile drive unit. Other users with different specialties in these prior systems may not have access to providing instructions to the mobile drive units, despite their specialties. In the present system, by allowing the flexibility of providing a generic process for creating new configurable electronic instructions for mobile drive units, the system is more efficient by reducing redundant development efforts and allowing more efficient maintenance processes to be implemented. Additionally, the mobile drive units may operate more effectively according to the specialists providing the configurable electronic instructions and generating new activity and input templates for use.

FIG. 1 illustrates an example architecture for providing generic maintenance activity scheduling described herein that includes a backend computing device, management module, and/or a mobile drive unit connected via one or more networks, according to at least one example. In illustration 100, the system for providing generic maintenance activity scheduling may comprise a user 102 operating a user device 104, a backend computing device 106, a management module 109, a mobile drive unit 114, and one or more communication networks 108, 112, 116.

In illustration 100, one or more users 102 (i.e., web browser users) may utilize user computing devices 104(1)-(N) (collectively, user devices 104) to access an application (e.g., a web browser), via one or more networks. In some aspects, the application may be hosted, managed, and/or provided by a computing resources service or service provider, such as by utilizing one or more service provider computers and/or one or more backend computing devices 106. The one or more backend computing devices 106 may, in some examples, provide computing resources such as, but not limited to, client entities, low latency data storage, durable data storage, data access, management, virtualization, cloud-based software solutions, electronic content performance management, etc. The one or more backend computing devices 106 may also be operable to provide web hosting, computer application development, and/or implementation platforms, combinations of the foregoing, or the like to the one or more users 102. The one or more backend computing devices 106, in some examples, may help provide generic maintenance activity scheduling for user devices 104.

The application may allow the users 102 to interact with a service provider computer, such as to access web content (e.g., web pages, music, video, etc.). The one or more backend computing devices 106, perhaps arranged in a cluster of servers or as a server farm, may host the application and/or cloud-based software services. Other server architectures may also be used to host the application. The application may be capable of handling requests from many users 102 and serving, in response, various item web pages. The application can provide any type of website that supports user interaction, including social networking sites, online retailers, informational sites, blog sites, search engine sites, news and entertainment sites, and so forth. As discussed above, the described techniques can similarly be implemented outside of the application, such as with other applications running on the user devices 104.

The user devices 104 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 104 may be in communication with the backend computing devices 106 via the networks 108, 112, 116, or via other network connections. Additionally, the user devices 104 may be part of the distributed system managed by, controlled by, or otherwise part of the backend computing devices 106 (e.g., a console device integrated with the backend computing devices 106).

In one illustrative configuration, the user devices 104 may include at least one memory and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The user devices 104 may also include geo-location devices (e.g., a global positioning system (GPS) device or the like)

for providing and/or recording geographic location information associated with the user devices 104.

The memory may store program instructions that are loadable and executable on the processor(s), as well as data generated during the execution of these programs. Depending on the configuration and type of user devices 104, the memory may be volatile (such as random access memory (RAM)) and/or non-volatile (such as read-only memory (ROM), flash memory, etc.). The user devices 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory of the user devices 104 in more detail, the memory may include an operating system and one or more application programs or services for implementing the features disclosed herein, such as via the browser application or dedicated applications (e.g., smart phone applications, tablet applications, etc.). The browser application may be configured to receive, store, and/or display a website or other interface for interacting with the backend computing devices 106. Additionally, the memory may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 102 provided response to a security question or a geographic location obtained by the user devices 104.

The backend computing device 106 may provide an application programming interface (API) or other user interface accessible by the user operating the user device 104. The backend computing device 106 may present the user interface that comprises a plurality of fields for accepting input from the user device via a first communication network. The user input may define a maintenance process for the mobile drive unit 114 of a physical workspace. The user interface may comprise at least one field associated with the user input for receiving configuration of an activity template and an input template. Through this process, the user device 104 may be able to provide input to control one or more operations of the mobile drive unit 114 while the mobile drive unit 114 maintains a default set of instructions for operation around the physical workspace. The backend computing device 106 may receive the user input via a first communication network and correlate the user input with the activity template.

The management module 109 may be located within a physical workspace 118 and also communicate with the mobile drive unit 114. For example, management module 109 may transmit an instruction to mobile drive unit 114 to move to a first location to accept an item from a picking area and drive to a second location where the item will be stored or stowed. In some examples, management module 109 may implement an executable instruction (e.g., script, etc.) that provides one or more activities to mobile drive unit 114 within the physical workspace 118. The executable files may be stored with a data store of executable files associated with the backend computing device 106 and/or management module 109. In some examples, the instructions may be incorporated with an data-interchange format that does not correspond with an executable file (e.g., JSON or JavaScript Object Notation).

In some examples, the management module 109 may assign tasks to components of inventory system and coordinate operation of the various components in completing the tasks. These tasks may relate not only to the movement and processing of inventory items, but also to the management and maintenance of the components of inventory system. For example, management module 109 may assign portions of physical workspace 118 as parking spaces for mobile drive units 114, the scheduled recharge or replacement of mobile drive unit batteries, the storage of container holders, or any other operations associated with the functionality supported by inventory system and its various components. Management module 109 may select components of inventory system to perform these tasks and communicate appropriate commands and/or data to the selected components to facilitate completion of these operations.

In a particular embodiment, mobile drive units 114 represent independent, self-powered devices configured to freely move about physical workspace 118. Examples of such inventory systems are disclosed in U.S. Pat. No. 9,087,314, issued on Jul. 21, 2015, titled "SYSTEM AND METHOD FOR POSITIONING A MOBILE DRIVE UNIT", and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 114 represent elements of a tracked inventory system configured to move container holders along tracks, rails, cables, crane system, or other guidance or support elements traversing physical workspace 118. The mobile drive unit 114 may also communicate with backend computing device 106 or management module 109 via one or more networks. Mobile drive unit 114 may operate according to instructions that are stored locally at mobile drive unit 114 or remotely from one or more computing devices. Additional details for each of these computing devices are provided throughout the disclosure.

The management module 109 and the mobile drive unit 114 may operate in a physical workspace 118. Mobile drive units 114 may transport container holders between points within the physical workspace 118 in response to commands communicated by management module 109. Each container holder stores one or more containers. Each container may store one or more types of inventory items. As a result, inventory system is capable of moving inventory items between locations within physical workspace 118 to facilitate the entry, processing, and/or removal of inventory items from inventory system and the completion of other tasks involving inventory items.

In some examples, the networks 108, 112, 116 may include any one or a combination of many different types of networks, such as cable networks, the Internet, wireless networks, cellular networks and other private and/or public networks. While the illustrated example represents the users 102 accessing the application over the networks 108, 112, 116, the described techniques may equally apply in instances where the users 102 interact with the backend computing devices 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.). As one example, particular embodiments of mobile drive unit 114 may communicate with management module 109 and/or with one another using 802.11, Bluetooth, or Infrared Data Association (IrDA) standards, or any other appropriate wireless communication protocol.

The mobile drive units 114 may transport inventory items. Inventory items may represent any objects suitable for storage, retrieval, and/or processing in an automated inventory system. For the purposes of this description, "inventory items" may represent any one or more objects of a particular type that are stored in inventory system. During operation, mobile drive units 114 may retrieve container holders containing one or more inventory items requested in an order to be packed for delivery to a customer or container holders carrying pallets containing aggregated collections of inventory items for shipment. Moreover, in particular embodiments of inventory system, boxes containing completed orders may themselves represent inventory items.

In particular embodiments, inventory system may also include one or more inventory stations. Inventory stations represent locations designated for the completion of particular tasks involving inventory items, including the performance of maintenance tasks determined by a user 102 operating a user device 104 and received from a backend computing device 106. Such tasks may also include the removal of inventory items and/or containers from container holders and/or container shuttles, the introduction of inventory items and/or containers into container holders and/or container shuttles, the counting of inventory items and/or containers in container holders and/or container shuttles, the decomposition of inventory items (e.g. from pallet- or case-sized groups to individual inventory items) into containers in container holders and/or container shuttles, the consolidation of inventory items and/or containers between container holders and/or container shuttles, transfer of inventory items and/or containers between container holders and/or container shuttles, and/or the processing or handling of inventory items in any other suitable manner. In particular embodiments, inventory stations may represent the physical locations where a particular task involving inventory items can be completed within physical workspace 118. In alternative embodiments, inventory stations may represent both the physical location and also any appropriate equipment for processing or handling inventory items, such as scanners for monitoring the flow of inventory items in and out of inventory system, communication interfaces for communicating with management module 109, and/or any other suitable components. Inventory stations may be controlled, entirely or in part, by human operators or may be fully automated. Moreover, the human or automated operators of inventory stations may be capable of performing certain tasks to inventory items, such as packing, counting, or transferring inventory items, as part of the operation of inventory system.

Physical workspace 118 represents an area associated with inventory system in which mobile drive units 114 can move and/or container holders can be stored. This may also correspond with a physical workspace discussed throughout the disclosure. For example, physical workspace 118 may represent all or part of the floor of a mail-order warehouse in which inventory system operates. The physical workspace 118 may include a fixed, predetermined, and finite physical space, or, in particular embodiments, the physical workspace 118 may comprise a variable dimensions and/or an arbitrary geometry space for movement of the mobile drive units 114. In some embodiments, the physical workspace 118 may be entirely enclosed in a building, or may also be located outdoors, within a vehicle (such as a cargo ship), located across more than one floor, or otherwise unconstrained by any fixed structure.

In operation, management module 109 selects appropriate components to complete particular tasks and transmits task assignments to the selected components to trigger completion of the relevant tasks. Each task assignment defines one or more tasks to be completed by a particular component. These tasks may relate to the retrieval, storage, replenishment, and counting of inventory items and/or the management of mobile drive units 114, container holders, inventory stations and other components of inventory system. Depending on the component and the task to be completed, a particular task assignment may identify locations, components, and/or actions associated with the corresponding task and/or any other appropriate information to be used by the relevant component in completing the assigned task.

In particular embodiments, management module 109 generates task assignments based, in part, on inventory requests that management module 109 receives from other components of inventory system and/or from external components in communication with management module 109. These inventory requests identify particular operations to be completed involving inventory items stored or to be stored within inventory system and may represent communication of any suitable form. For example, in particular embodiments, an inventory request may represent a shipping order specifying particular inventory items that have been purchased by a customer and that are to be retrieved from inventory system for shipment to the customer. Management module 109 may also generate task assignments independently of such inventory requests, as part of the overall management and maintenance of inventory system. For example, management module 109 may generate task assignments in response to the occurrence of a particular event (e.g., in response to a mobile drive unit 114 requesting a space to park), according to a predetermined schedule (e.g., as part of a daily start-up routine), or at any appropriate time based on the configuration and characteristics of inventory system. After generating one or more task assignments, management module 109 transmits the generated task assignments to appropriate components for completion of the corresponding task. The relevant components then execute their assigned tasks.

With respect to mobile drive units 114 specifically, management module 109 may, in particular embodiments, communicate task assignments to selected mobile drive units 114 that identify one or more destinations for the selected mobile drive units 114. Management module 109 may select a mobile drive unit 114 to assign the relevant task based on the location or state of the selected mobile drive unit 114, an indication that the selected mobile drive unit 114 has completed a previously-assigned task, a predetermined schedule, and/or any other suitable consideration. These destinations may be associated with an inventory request the management module 109 is executing or a management objective the management module 109 is attempting to fulfill. For example, the task assignment may define the location of a container holder to be retrieved, an inventory station to be visited, a storage location where the mobile drive unit 114 should park until receiving another task, or a location associated with any other task appropriate based on the configuration, characteristics, and/or state of inventory system, as a whole, or individual components of inventory system. For example, in particular embodiments, such decisions may be based on the popularity of particular inventory items, the staffing of a particular inventory station, the tasks currently assigned to a particular mobile drive unit 114, and/or any other appropriate considerations.

As part of completing these tasks, mobile drive units 114 may dock with and transport container holders within physical workspace 118. Mobile drive units 114 may dock with container holders by connecting to, lifting, and/or otherwise interacting with container holders in any other suitable manner so that, when docked, mobile drive units 114 are coupled to and/or support container holders and can move container holders within physical workspace 118. While the description below focuses on particular embodiments of mobile drive unit 114 and container holder that are configured to dock in a particular manner, alternative embodiments of mobile drive unit 114 and container holder may be configured to dock in any manner suitable to allow mobile drive unit 114 to move container holder within physical workspace 118.

While the appropriate components of inventory system complete assigned tasks, management module 109 may interact with the relevant components to ensure the efficient use of space, equipment, manpower, and other resources available to inventory system. As one specific example of such interaction, management module 109 is responsible, in particular embodiments, for planning the paths mobile drive units 114 take when moving within physical workspace 118 and for allocating use of a particular portion of physical workspace 118 to a particular mobile drive unit 114 for purposes of completing an assigned task. In such embodiments, mobile drive units 114 may, in response to being assigned a task, request a path to a particular destination associated with the task. Moreover, while the description below focuses on one or more embodiments in which mobile drive unit 114 requests paths from management module 109, mobile drive unit 114 may, in alternative embodiments, generate its own paths.

Components of inventory system may provide information to management module 109 regarding their current state, other components of inventory system with which they are interacting, and/or other conditions relevant to the operation of inventory system. This may allow management module 109 to utilize feedback from the relevant components to update algorithm parameters, adjust policies, or otherwise modify its decision-making to respond to changes in operating conditions or the occurrence of particular events. At least some of the feedback may be transmitted to the backend computing device 116 to present to a user interface for the user 102 and/or update a status of a maintenance task of an activity template defined by the user device 104.

In addition, while management module 109 may be configured to manage various aspects of the operation of the components of inventory system, in particular embodiments, the components themselves may also be responsible for decision-making relating to certain aspects of their operation, thereby reducing the processing load on management module 109.

Thus, based on its knowledge of the location, current state, and/or other characteristics of the various components of inventory system and an awareness of all the tasks currently being completed, management module 109 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system may be able to support a number of techniques for efficiently executing various aspects of the operation of inventory system. As a result, particular embodiments of management module 109 may, by implementing one or more management techniques described below, enhance the efficiency of inventory system and/or provide other operational benefits.

Figure 2:
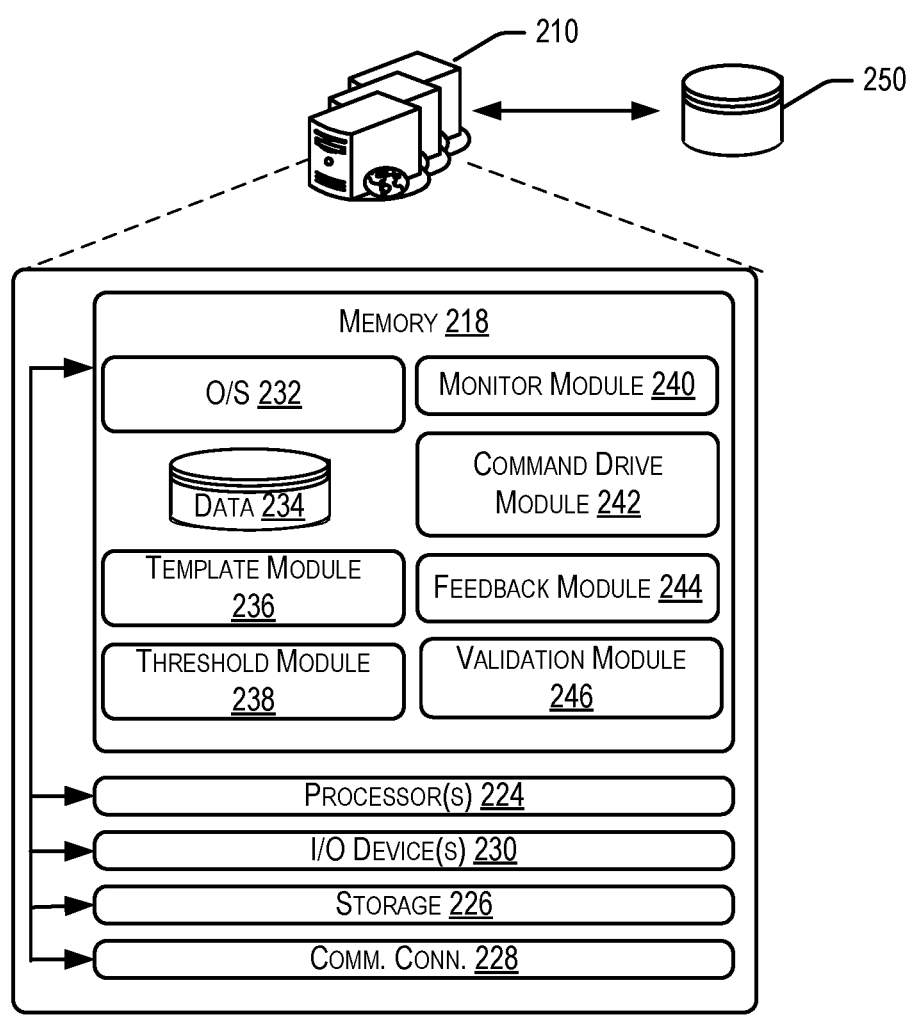
FIG. 2 illustrates an example architecture of the backend computing device and schedule data store, according to at least one example.

FIG. 2 illustrates an example architecture of the backend computing device and schedule data store, according to at least one example. In illustration 200, computing device 210 may correspond with the backend computing device 106 illustrated with FIG. 1.

In some aspects, the computing device 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the computing device 210 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the computing device 210 may be in communication with one or more user devices and/or other service providers via a communication network. The computing device 210 may include one or more servers, perhaps arranged in a cluster, as a server farm, or as individual servers not associated with one another. These servers may be configured to implement the analysis and processing described herein as part of an integrated, distributed computing environment.

In one illustrative configuration, the computing device 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of computing device 210, the memory 218 may be volatile (such as RAM) and/or non-volatile (such as ROM, flash memory, etc.). The computing device 210 may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are examples of computer storage media. Additional types of computer storage media that may be present in the computing device 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by computing device 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 210 may also contain communications connection(s) 228 that allow computing device 210 to communicate with a stored database, another computing device or server, user terminals and/or other devices on a communication network. The computing device 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a template module 236, a threshold module 238, a monitor module 240, a command drive module 242, feedback module 244, and/or a validation module 246. The modules may be software modules, hardware modules, or a combination thereof. If the modules are software modules, the modules will be embodied on a computer readable medium and processed by a processor in any of computer systems described herein.

The template module 236 may be configured to validate input received in association with an activity template or an input template that helps to define a maintenance process for a plurality of mobile drive units of the physical workspace. For example, in an activity template, the activities may be limited to pre-defined activities stored in a data store. The template module 236 may be configured to receive a list of available activities from a data store and present the list of available activities to a user interface for selection with the activity template. These may include move, stop, accept software or hardware upgrade, restart, and the like. The template module 236 may confirm that the activities received from user input correspond with one or more pre-defined activities. In another example, the template module 236 may confirm that input received for the input template is accurate. This may include confirming any mobile drive unit information corresponds with available mobile drive units in the physical workspace and other information accepted as input for the input template.

The template module 236 may also be configured to receive input for the input template. For example, unlike the activity template, the input template may allow free-form input from the user. The input may comprise a firmware update description, a version number of a firmware upgrade, a model number of new hardware that may be installed with the mobile drive unit, a sensor setting (e.g., new camera setting, etc.), and the like. In some examples, the available input may be identified from a data store and filtered based at least in part on the selected activity for the activity template.

The template module 236 may also be configured to store the activity template and the input template as separate executable files. In some examples, the separation of templates may enable the system to provide these templates to users to alter and select for different uses. For example, a particular input may identify a particular subset of mobile drive units. When the input template is reused, the particular subset of mobile drive units may perform a different action according to a different activity template without the need for selecting the subset of mobile drive units a second time. In another example, a particular activity may identify a plurality of steps. When the activity template is reused, the particular subset of activities may be performed by different mobile drive units or correspond with different firmware versions that are identified in new input for the reused activity template.

The template module 236 may also be configured to reuse templates. For example, an activity may comprise a credential rotation. This may include one or more mobile drive units that are operable according to a credential associated with firmware. The credential may be refreshed according to a time period (e.g., every six months). A first subset of mobile drive units may operate in association with a first credential and a second subset of mobile drive units may operate in association with a second credential. When the first credential is about to expire, the activity template in association with rotating credentials may be activated to associate the first subset of mobile drive units with a third credential and remove the first credential. In this example, the activity template may comprise moving the first subset of mobile drive units to a first location, removing the first credential from the first subset of mobile drive units, adding the third credential to the first subset of mobile drive units, and moving the first subset of mobile drive units to a second location. This activity template may be activated according at the time period (e.g., activate the template every six month, automatically, etc.) and the input in association with this activity template may be updated to identify the new subset of mobile drive units, which credential to remove, and which new credential to add.

The threshold module 238 may be configured to alter the actions of one or more mobile drive units in response to one or more failure rules. In some examples, the operation of a mobile drive unit (e.g., received in a status update via the monitoring module 240) may trigger an error notification that is transmitted from the mobile drive unit to the threshold module 238. When received, the threshold module 238 may increment an error rating in association with the mobile driving in response to the status update. The error reading may be compared with a critical threshold or other threshold identifier. When the error reading exceeds the critical threshold, the threshold module 238 may determine an instruction for the mobile drive units in response to the error status.

The threshold module 238 may also be configured to perform a root cause determination (e.g., based at least in part on the status update, etc.). For example, when a failure rule is activated and/or a critical threshold has been met or exceeded, the threshold module 238 may determine the cause of the failure. This may identify relevant status updates from the mobile device or management module, or the activity that has completed just prior to the reported failure. In some examples, the threshold module may identify activities that are critical and flag these activities in the data store to help determine the root cause of the failure. As a simple illustration, a firmware update may be a critical activity that a movement of a mobile drive unit may not.

The monitor module 240 may be configured to receive status updates from one or more mobile drive units during or after completion of one or more operations. In some examples, the monitor module 240 may provide the status of a mobile drive units in relation to the configurable electronic instructions from the user. The user may identify one or more steps of the process that the mobile drive unit has completed based at least in part on the monitor module display via the user interface.

The command drive module 242 may be configured to determine configurable electronic instructions of configurable steps for one or more mobile drive units. The command drive module 242 may identify high level movement of the mobile drive unit and the mobile drive unit itself may identify an active path to get to the particular location identified by the command drive module 242.

The command drive module 242 may also, in communication with the threshold module 238, to determine an auxiliary or post mortem workflow for a mobile drive unit upon failure of the activity. As described with the threshold module 238, the system may determine a root cause of failure for the mobile drive unit. In conjunction with a route cause determination, the command drive module 242 may identify a pattern that is common with one or more other mobile drive units that have failed and report the identified pattern as a status update. In some examples, the command drive module 242 may instruct the mobile drive unit to automatically terminate the configurable steps performed by the mobile drive unit prior to the expected failure. In some examples, the auxiliary workflow may instruct one or more mobile drive units to return to a location or other activity. In the example where the failure has happened, the post mortem workflow may instruct the mobile drive unit to identify itself to other mobile drive units to avoid potential collisions or provide a signal to easily identify the mobile drive unit after the failure.

The command drive module 242 may also, in communication with the threshold module 238, to determine a cancelation instruction. For example, the cancelation instruction may instruct the mobile drive unit to stop any action associated with the first configurable electronic instruction. The mobile drive unit may abandon any action from the first configurable electronic instruction (e.g., moving to a first location, receiving the firmware or component upgrade, etc.) and revert back to standard operations after the cancelation instruction is received.

The feedback module 244 may be configured to provide feedback and status updates via the user interface. For example, the feedback module 244 may provide a list of activities or steps performed by the mobile drive unit at a particular point in time. This may include any of the analysis performed by the system as well, including root cause determination of a failure for the mobile drive unit, an auxiliary workflow, a post mortem workflow, a current location of a mobile drive unit, additional configurable steps that will be performed by the mobile drive unit, or other relevant information. The feedback may be received from the mobile drive units, from the management module, or other computing devices associated with the physical workspace.

The feedback module 244 may also be configured to observe activities of the mobile drive units prior to transmitting a subsequent instruction to the mobile drive units (e.g., at a first time, second time, etc.). For example, the feedback module 244 may receive one or more status updates associated with the first configurable electronic instruction. The status updates may correspond with observed behavior of the mobile drive units. The first status update at a first time may identify that the mobile drive unit is moving to the first location in accordance with the first portion of the instructed activity. The second status update at a second time may identify that the mobile drive unit has started to receive the firmware upgrade or the new calibration settings, for example, in accordance with the second portion of the instructed activity, and so on. In some examples, the status update may identify that the mobile drive unit is not performing in accordance with the instructed activity when the instructed activity is supposed to be occurring. The feedback may be presented to the user (e.g., as illustrated with FIG. 5), stored with the backend computer, or the like.

The feedback module 244 may also be configured to observe activities of the mobile drive units for a time range after the configurable electronic instruction is transmitted to the mobile drive units. For example, the observation may begin upon a predetermined time range (e.g., five minutes after completion of the electronic instructions, etc.). The mobile drive units may be presumed to have completed the configurable electronic instruction after the predetermined time range. The feedback module 244 may be configured to observe the activities to help ensure that the mobile drive units do not lose capabilities (e.g., can still receive instructions from the management module, can still drive to locations for packing and stowing, etc.). When the activities are impaired based at least in part on implementing the configurable electronic instruction, the error rating may be incremented and/or compared with a critical threshold. In some examples, the feedback module 244, in communication with the threshold module 238, may transmit a cancelation instruction or initiate an auxiliary or post mortem workflow.

The feedback module 244 may also be configured to throttle activities of the mobile drive units based at least in part on the feedback. For example, the feedback may identify an obstacle detected in the physical workspace. The feedback module 244, in communication with the command drive module 242, may instruct the mobile drive unit to avoid the obstacle. In another example, the feedback module 244 may identify a cluster of mobile drive units in one area (e.g., the maintenance workspace to receive a firmware upgrade, etc.). The feedback module 244, in communication with the command drive module 242, may instruct a subset of the mobile drive units to perform activities in a different location that is away from the cluster of mobile drive units performing a similar activity.

The validation module 246 may be configured to receive user input in association with the activity template or the input template and confirm that the input is acceptable. For example, user input corresponding with a particular mobile drive unit may confirm that the mobile drive unit is available in the physical workspace. In another example, the user input corresponding with particular configuration settings, firmware version or other information, component upgrade information, or calibration settings may confirm that the information received corresponds with executables that are available (e.g., firmware version 1.0 is available but not firmware version 2.0, etc.).

The schedule service data store 250 may store scheduling activities of the mobile drive units. For example, a first mobile drive unit may be instructed to move to a first location, receive a firmware upgrade, and moved to a second location. Each of these three activities may be stored in the schedule service data store 250. The plurality of activities performed by the plurality of mobile drive units may be stored in the schedule service data store 250 and accessed to provide status updates and update user interfaces in response to the current or future activities.

Figure 3:
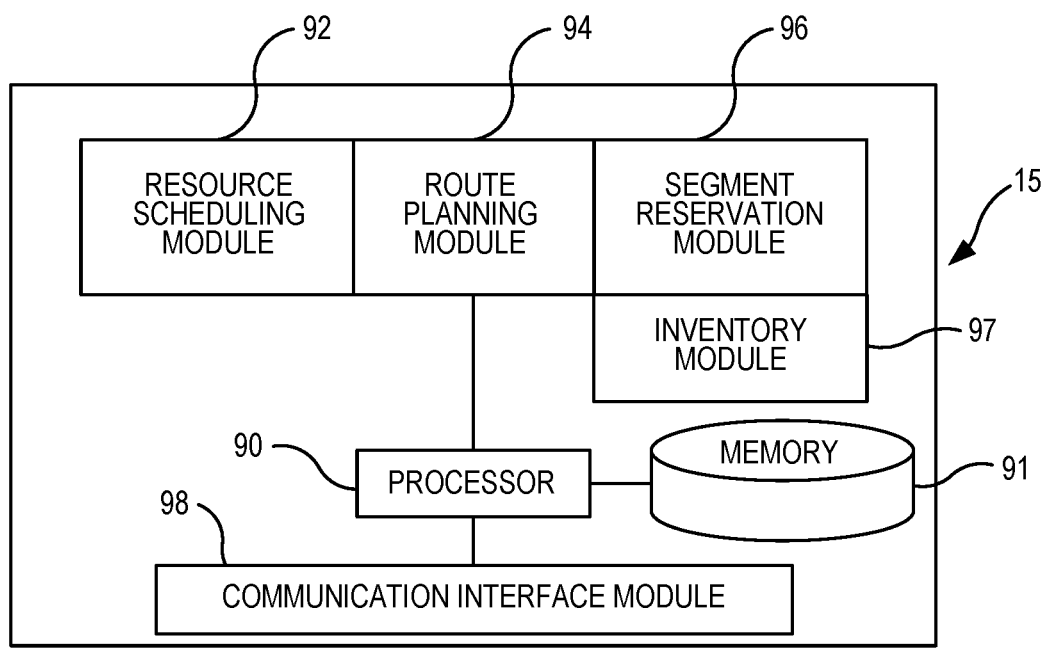
FIG. 3 illustrates in greater detail components of an example management module that may be utilized in particular embodiments of the inventory system as described herein, in accordance with at least one embodiment.

FIG. 3 illustrates in greater detail components of an example management module that may be utilized in particular embodiments of the inventory system as described herein, in accordance with at least one embodiment. As shown, the example embodiment of a management module 15 includes a resource scheduling module 92, a route planning module 94, a segment reservation module 96, an inventory module 97, a communication interface module 98, a processor 90, and a memory 91. Management module 15 may represent a single component, multiple components located at a central location within inventory system, or multiple components distributed throughout inventory system. For example, management module 15 may represent components of one or more mobile drive units 114 that are capable of communicating information between the mobile drive units 114 and coordinating the movement of mobile drive units 114 within a physical workspace 118. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 114 to recharge batteries or have batteries replaced, instructing inactive mobile drive units 114 to park in a location outside the anticipated traffic flow or a location near the anticipated site of future tasks, and/or directing mobile drive units 114 selected for repair or maintenance to move towards a designated maintenance station.

Route planning module 94 receives route requests from mobile drive units 114. These route requests identify one or more destinations associated with a task the requesting mobile drive unit 114 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 114 using communication interface module 98.

Segment reservation module 96 receives reservation requests from mobile drive units 114 attempting to move along paths generated by route planning module 94. These reservation requests request the use of a particular portion of physical workspace 118 (referred to herein as a "segment") to allow the requesting mobile drive unit 114 to avoid collisions with other mobile drive units 114 while moving across the reserved segment. In response to received reservation requests, segment reservation module 96 transmits a reservation response granting or denying the reservation request to the requesting mobile drive unit 114 using the communication interface module 98.

The inventory module 97 maintains information about the location and number of inventory items in the inventory system. Information can be maintained about the number of inventory items in a particular container holder, and the maintained information can include the location of those inventory items in the container holder. The inventory module 97 can also communicate with the mobile drive units 114, utilizing task assignments to maintain, replenish or move inventory items within the inventory system. In a particular embodiment, the inventory module 97 can coordinate the transfer of containers between container holders and other locations where container can be held. For example, the inventory module 97 may be configured to provide human-readable and/or machine-readable instructions to operators, whether human, automated, or otherwise, identifying containers within container holders that are to be transferred.

Communication interface module 98 facilitates communication between management module 15 and other components of inventory system, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 114 or other components of inventory system. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4A:
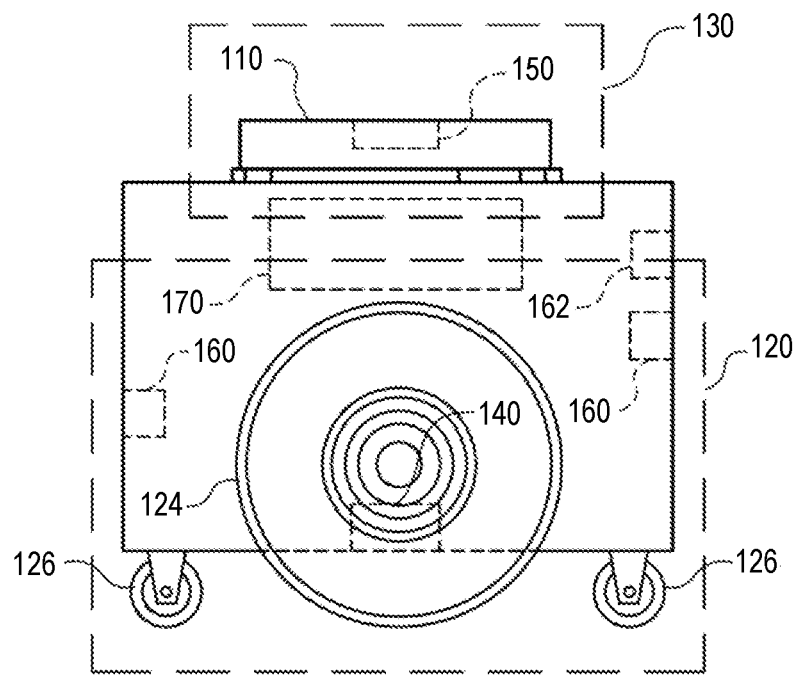
FIGS. 4A and 4B illustrate in greater detail an example mobile drive unit that may be utilized in particular embodiments of the inventory system as described herein, in accordance with at least one embodiment.
Figure 4B:
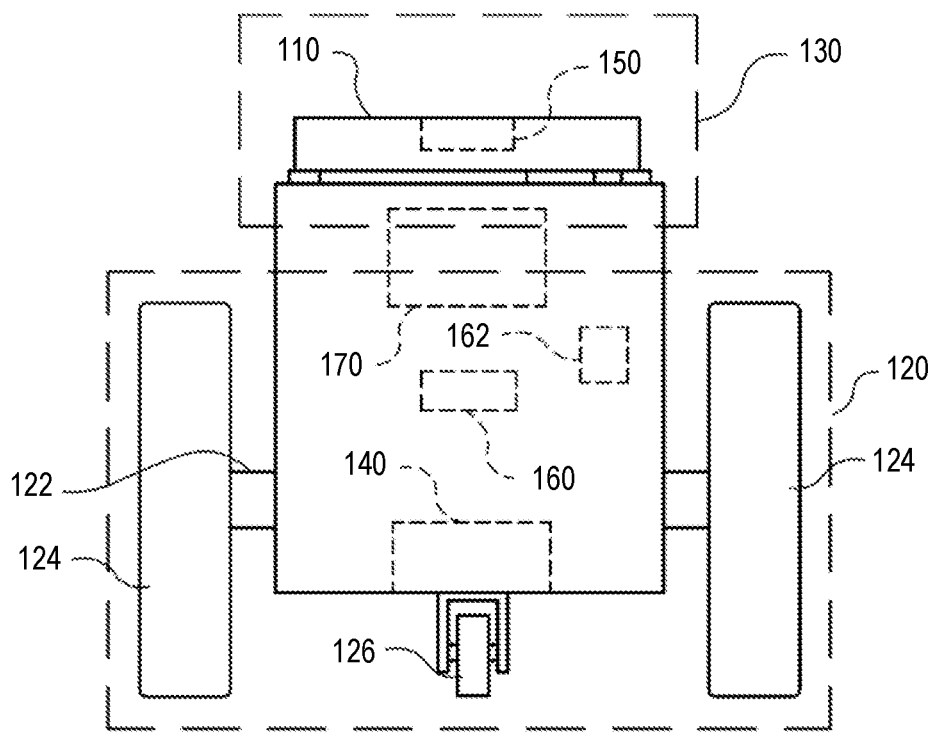

FIGS. 4A and 4B illustrate in greater detail an example mobile drive unit that may be utilized in particular embodiments of the inventory system as described herein, in accordance with at least one embodiment. In particular, FIGS. 4A and 4B include a front and side view of an example mobile drive unit 114. Mobile drive unit 114 includes a docking head 110, a drive module 120, a docking actuator 130, and a control module 170. Additionally, mobile drive unit 114 may include one or more sensors configured to detect or determine the location of mobile drive unit 114, container holder, and/or other appropriate elements of inventory system. In the illustrated embodiment, mobile drive unit 114 includes a position sensor 140, a holder sensor 150, an obstacle sensor 160, and an identification signal transmitter 162.

Any of these or other components of the mobile drive unit 114 may be identified in the maintenance activity and/or input template. For example, the position sensor 140, holder sensor 150, or obstacle sensor 160 may require calibration, or a docking actuator 130 may require replacement with a new docking actuator. In a sample illustration, the first user input associated with the activity template may identify the particular sensor and the request for calibration of the sensor. The second user input associated with the input template may identify the mobile drive units the comprise the particular sensor and define the maintenance process as calibrating the sensors in these mobile drive units. In some examples, a status of these components (e.g., operational, disabled, pending operation, etc.) may be transmitted to the backend computing device 106 or management module 109, as illustrated in FIG. 1.

Docking head 110, in particular embodiments of mobile drive unit 114, couples mobile drive unit 114 to container holder and/or supports container holder when mobile drive unit 114 is docked to container holder. Docking head 110 may additionally allow mobile drive unit 114 to maneuver container holder, such as by lifting container holder, propelling container holder, rotating container holder, and/or moving container holder in any other appropriate manner. Docking head 110 may also include any appropriate combination of components, such as ribs, spikes, and/or corrugations, to facilitate such manipulation of container holder. For example, in particular embodiments, docking head 110 may include a high-friction portion that abuts a portion of container holder while mobile drive unit 114 is docked to container holder. In such embodiments, frictional forces created between the high-friction portion of docking head 110 and a surface of container holder may induce translational and rotational movement in container holder when docking head 110 moves and rotates, respectively. As a result, mobile drive unit 114 may be able to manipulate container holder by moving or rotating docking head 110, either independently or as a part of the movement of mobile drive unit 114 as a whole.

Drive module 120 propels mobile drive unit 114 and, when mobile drive unit 114 and container holder are docked, container holder. Drive module 120 may represent any appropriate collection of components operable to propel mobile drive unit 114. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 114.

Docking actuator 130 moves docking head 110 towards container holder to facilitate docking of mobile drive unit 114 and container holder. Docking actuator 130 may also be capable of adjusting the position or orientation of docking head 110 in other suitable manners to facilitate docking. Docking actuator 130 may include any appropriate components, based on the configuration of mobile drive unit 114 and container holder, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with container holder.

Drive module 120 may be configured to propel mobile drive unit 114 in any appropriate manner. For example, in the illustrated embodiment, motorized wheels 124 are operable to rotate in a first direction to propel mobile drive unit 114 in a forward direction. Motorized wheels 124 are also operable to rotate in a second direction to propel mobile drive unit 114 in a backward direction. In the illustrated embodiment, drive module 120 is also configured to rotate mobile drive unit 114 by rotating motorized wheels 124 in different directions from one another or by rotating motorized wheels 124 at different speeds from one another.

Position sensor 140 represents one or more sensors, detectors, or other components suitable for determining the location of mobile drive unit 114 in any appropriate manner. For example, in particular embodiments, the physical workspace 118 associated with inventory system includes a number of fiducial marks that mark points on a two-dimensional grid that covers all or a portion of physical workspace 118. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 114 and to aid in navigation when moving within physical workspace 118.

Holder sensor 150 represents one or more sensors, detectors, or other components suitable for detecting container holder and/or determining, in any appropriate manner, the location of container holder, as an absolute location or as a position relative to mobile drive unit 114. Holder sensor 150 may be capable of detecting the location of a particular portion of container holder or container holder as a whole. Mobile drive unit 114 may then use the detected information for docking with or otherwise interacting with container holder.

Obstacle sensor 160 represents one or more sensors capable of detecting objects located in one or more different directions in which mobile drive unit 114 is capable of moving. Obstacle sensor 160 may utilize any appropriate components and techniques, including optical, radar, sonar, pressure-sensing and/or other types of detection devices appropriate to detect objects located in the direction of travel of mobile drive unit 114. In particular embodiments, obstacle sensor 160 may transmit information describing objects it detects to control module 170 to be used by control module 170 to identify obstacles and to take appropriate remedial actions to prevent mobile drive unit 114 from colliding with obstacles and/or other objects.

Obstacle sensor 160 may also detect signals transmitted by other mobile drive units 114 operating in the vicinity of the illustrated mobile drive unit 114. For example, in particular embodiments of inventory system, one or more mobile drive units 114 may include an identification signal transmitter 162 that transmits a drive identification signal. The drive identification signal indicates to other mobile drive units 114 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 114.

Additionally, in particular embodiments, obstacle sensor 160 may also be capable of detecting state information transmitted by other mobile drive units 114. For example, in particular embodiments, identification signal transmitter 162 may be capable of including state information relating to mobile drive unit 114 in the transmitted identification signal. This state information may include, but is not limited to, the position, velocity, direction, and the braking capabilities of the transmitting mobile drive unit 114. In particular embodiments, mobile drive unit 114 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 114 based on this information. Additionally, in particular embodiments, mobile drive unit 114 may be configured to communicate with a management device of inventory system and control module 170 may receive commands transmitted to mobile drive unit 114 and communicate information back to the management device utilizing appropriate communication components of mobile drive unit 114. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 114.

Moreover, in particular embodiments, control module 170 may include hardware and software located in components that are physically distinct from the device that houses drive module 120, docking actuator 130, and/or the other components of mobile drive unit 114 described above. For example, in particular embodiments, each mobile drive unit 114 operating in inventory system may be associated with a software process (referred to here as a "drive agent") operating on a server that is in communication with the device that houses drive module 120, docking actuator 130, and other appropriate components of mobile drive unit 114. This drive agent may be responsible for requesting and receiving tasks, requesting and receiving routes, transmitting state information associated with mobile drive unit 114, and/or otherwise interacting with management module 15 and other components of inventory system on behalf of the device that physically houses drive module 120, docking actuator 130, and the other appropriate components of mobile drive unit 114. As a result, for the purposes of this description and the claims that follow, the term "mobile drive unit" includes software and/or hardware, such as agent processes, that provides the described functionality on behalf of mobile drive unit 114 but that may be located in physically distinct devices from the drive module 120, docking actuator 130, and/or the other components of mobile drive unit 114 described above.

While FIGS. 4A and 4B illustrate a particular embodiment of mobile drive unit 114 containing certain components and configured to operate in a particular manner, mobile drive unit 114 may represent any appropriate component and/or collection of components configured to transport and/or facilitate the transport of container holders. As another example, mobile drive unit 114 may represent part of an overhead crane system in which one or more crane assemblies are capable of moving within a network of wires or rails to a position suitable to dock with a particular container holder. After docking with container holder, the crane assembly may then lift container holder and move inventory to another location for purposes of completing an assigned task.

Furthermore, in particular embodiments, mobile drive unit 114 may represent all or a portion of container holder. Container holder may include motorized wheels or any other components suitable to allow container holder to propel itself. As one specific example, a portion of container holder may be responsive to magnetic fields. Inventory system may be able to generate one or more controlled magnetic fields capable of propelling, maneuvering and/or otherwise controlling the position of container holder as a result of the responsive portion of container holder. In such embodiments, mobile drive unit 114 may represent the responsive portion of container holder and/or the components of inventory system responsible for generating and controlling these magnetic fields. While this description provides several specific examples, mobile drive unit 114 may, in general, represent any appropriate component and/or collection of components configured to transport and/or facilitate the transport of container holders.

Figure 5:
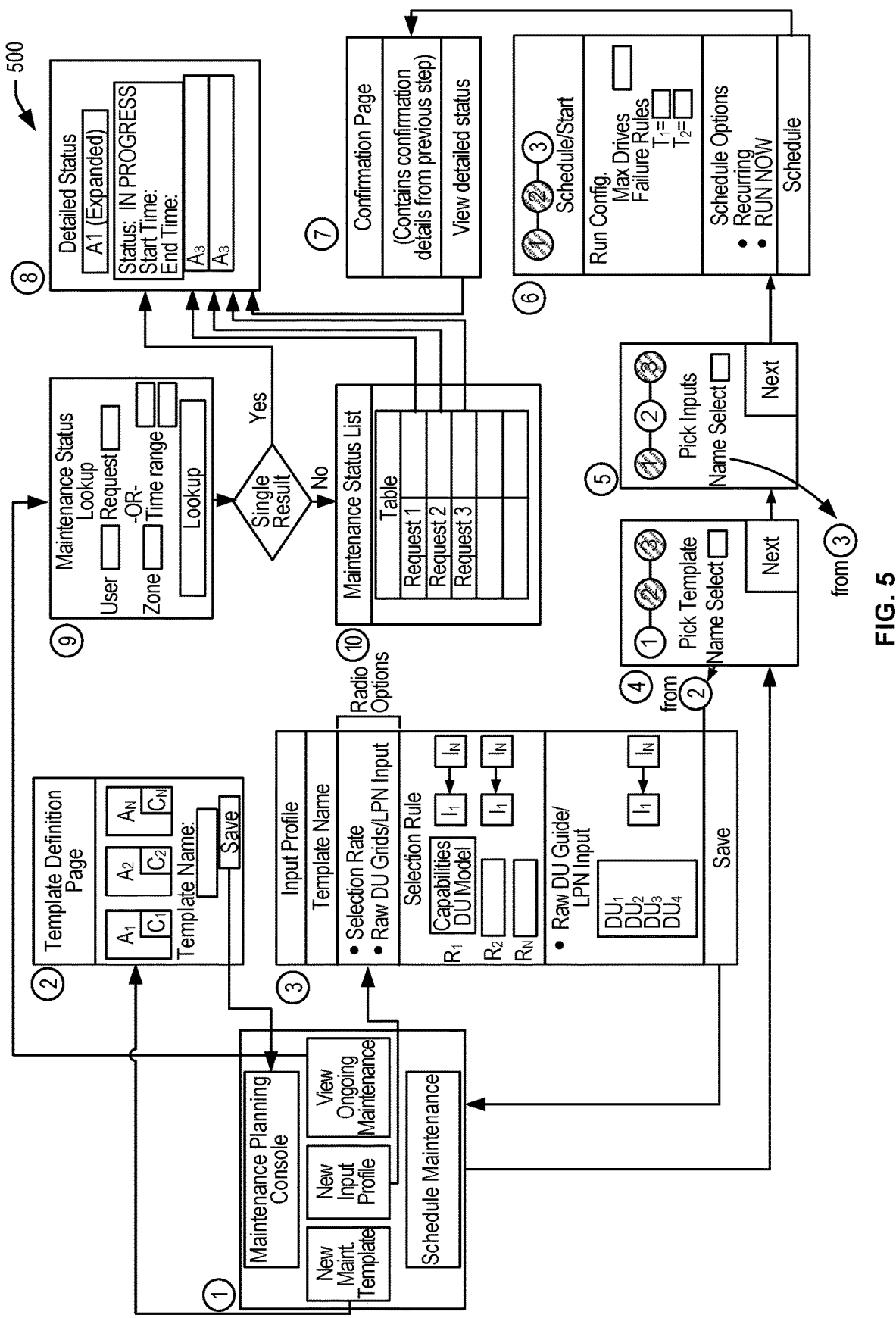
FIG. 5 illustrates a process flow of user interfaces provided by a computing device, in accordance with at least one embodiment.

FIG. 5 illustrates a process flow of user interfaces provided by a computing device, in accordance with at least one embodiment. For example, in illustration 500, the backend computing device 106 may communicate with the management module 109 to facilitate communication with other components of the inventory system. As a sample illustration, the backend computing device 106 may determine a high level series of configurable steps performed by the mobile drive units and the management module 109 may determine the feasibility of particular instructions with respect to other route requests, reservation requests, task assignments, and the like. Using the new information, the backend computing device 106 may populate one or more user interfaces with real-time information from the physical workspace.

At step 1, a computing device of the system provides a user interface with fields for the user to define a new maintenance activity template, input profile, view ongoing maintenance for the mobile drive units, or schedule feature maintenance for the mobile drive units. The user may select any of these options, including the option to generate a new maintenance activity template.

At step 2, the computing device may display a user interface for accepting the definition and configurable settings of the activity template. The user may define one or more activities for the mobile drive unit. For example, the activity templates (illustrated as $A_1, A_2, \ldots A_N$) may comprise one or more configurable options for each of the activity templates (illustrated as $C_1, C_2, \ldots C_N$). The server computer may also receive a name or other identifier for a plurality of new activity templates (or individual activity templates) and store the grouping in a data store.

In a sample illustration, the first activity may correspond with instructing the mobile drive unit to drive to a first location, the second activity may correspond with instructing the mobile drive unit to receive a firmware or component upgrade, and the third activity may correspond with instructing the mobile drive unit to return to its original location from the first location. These three activities may be associated with the new activity template.

At step 3, the computing device may update the user interface to accept a new input profile through an input template. For example, the user interface may provide the ability to access a previously stored template. Once selected, the user interface may provide a plurality of radio buttons for receiving input in association with the input template. They user interface may provide one or more selection rules (illustrated as $R_1, R_2, \ldots R_N$) for a particular input (illustrated as $I_1, I_2, \ldots I_N$).

In a sample illustration, continuing with the activity template illustration, the user may access the maintenance activity template that it created and provide input for the created activity template. The input may correspond with particular mobile drive units that will receive the firmware upgrade according to the activity template or other information. The other information may comprise the version number of the firmware upgrade, an executable file associated with the firmware upgrade, a device that may perform the firmware upgrade, or other relevant information. In some examples, the information may be pre-filtered so that the user is only able to select input that is permissible by the system for the particular mobile drive unit or operation(s). The server computer may also receive a name or other identifier for the new input template and store the new input template in a data store.

At step 4, the computing device may present the user with a user interface to select a previously identified activity template. The user may select a corresponding name of the activity template that was identified at step 2.

At step 5, the computing device may allow the user to select a previously identified input template through the user interface. In some examples, the user may select a corresponding name of the input template that was identified in step 3.

At step 6, the computing device may present the user with a user interface to initiate the activities associated with the configurable electronic instruction identified in the activity template and input template. For example, the user may identify a maximum number of mobile drive units that may perform the configurable steps in the physical workspace or any failure rules that the user would like to add in addition to any failure rules determined by the computing device. The user interface may also prompt the user to initiate the steps performed by the subset of the plurality of mobile drive units at the present time or at a future time.

The failure rules may be automatically added, sometimes irrespective of the input from the user interface. For example, the computing device may receive an activity that may correspond with a failure rule by matching the activity with a potential failure rule stored in the data store. The correlation between activities and failure rules may be predetermined, so that when the activity is selected by the user, the computing device may automatically correlate the failure rule with the activity. In some examples, the determined failure rule may be transmitted to the mobile drive unit and a similar process as transmitting the configurable electronic instruction to perform an activity.

As a sample illustration, the activity may be moving a mobile drive unit and the potential failure may correspond with the mobile drive unit not moving. The identification of the failure may be determined from the status or feedback. The status of the mobile drive unit may identify that the mobile drive unit is instructed to move, but the mobile drive unit location has remained unchanged in the feedback (e.g., based at least in part on positioning system data, GPS, or the like). As shown in this illustration, when the computing device receives an activity associated with moving the mobile drive unit, for example, the computing device may automatically correlate the failure rule associated with not being able to move the mobile drive unit.

In some examples, the configurable activities performed by the mobile drive units may correspond with a time range. For example, the activity and input templates may be identified for the subset of mobile drive units in association with configurable electronic instructions of configurable steps performed by a subset of mobile drive units. The user may also identify a first time range for a first configurable electronic instruction and a second time range for a second configurable electronic instruction, so that the configurable electronic instructions may be performed according to these identified time ranges. These time ranges may correspond with a timing that the mobile drive unit will perform the actions. The system may transmit the configurable electronic instruction so that the mobile drive units are enabled perform these instructions during the first and second time ranges, respectively.

In some examples, feedback may alter the time ranges for performing these activities. As a sample illustration, the feedback may identify a mobile drive unit as unable to perform a move operation. In response to the feedback, the system may adjust the first time range or the second time range to delay a start of the activity. In some examples, the system may adjust the first time range or the second time range to correspond with a different mobile drive unit.

At step 7, the computing device may provide a confirmation network page that includes details received from the user interface in association with step 6. In some examples, the user interface may provide access to detailed status information of the one or more mobile drive units.

At step 8, the computing device may provide a detailed status update. In some examples the detailed status update may identify a particular configurable step in the identified activity template and present additional information associated with that step. This may include a particular mobile drive unit that has started implementing the configurable step, a start or end time of the status of the activity, and other information.

The user interface may also permit a maintenance status lookup via the user interface. For example, at step 9, a user may determine which of the activities have been submitted to mobile drive units in the form of configurable electronic instructions. The user interface may also provide access to activities that are performed in particular areas of the physical workspace and/or time ranges when activities will take place. In response to the lookup via the user interface, the computing device may track these requests in a status list or audit log as illustrated with step 10.

Figure 6:
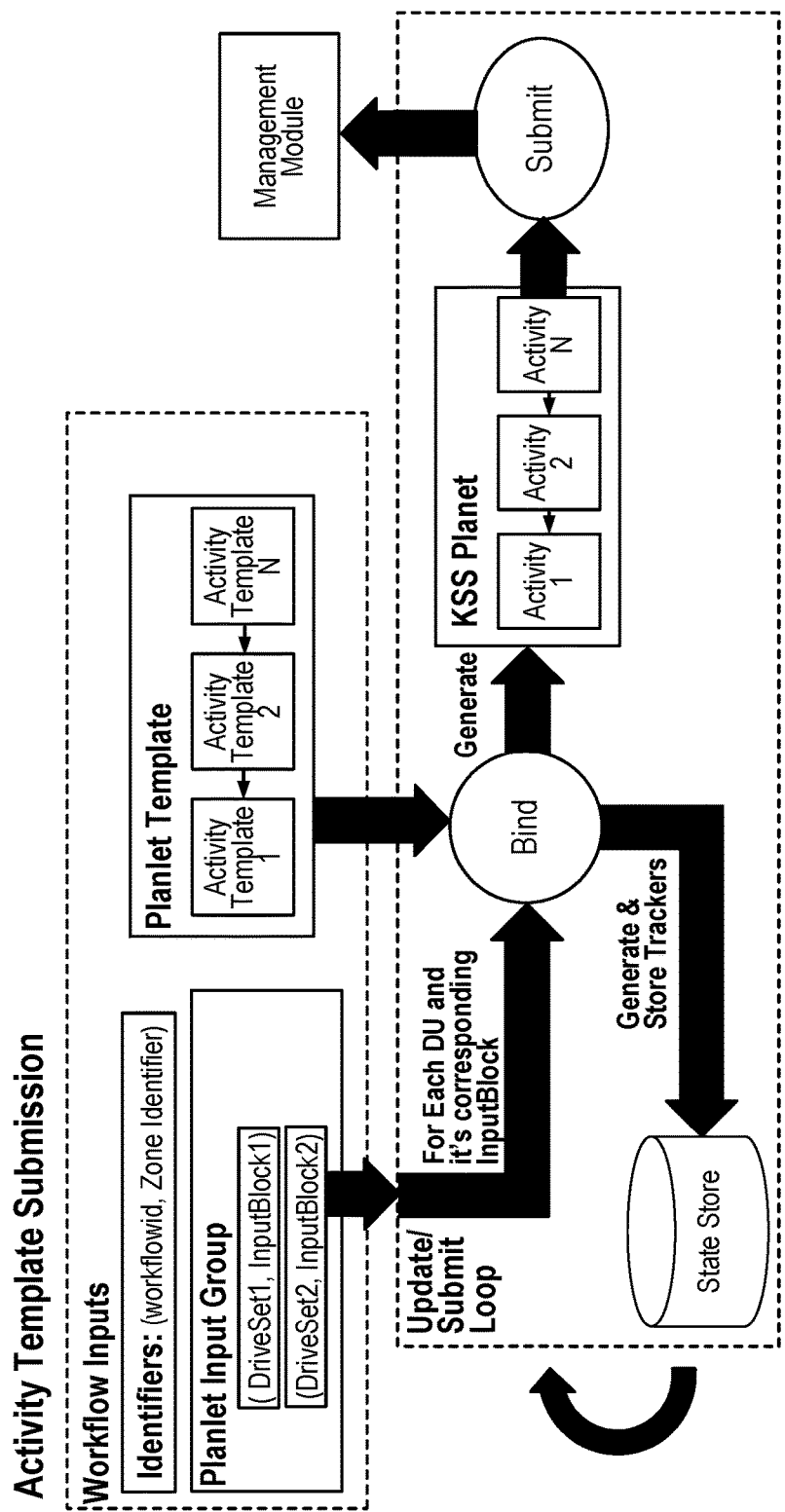
FIG. 6 illustrates an activity template submission workflow, in accordance with at least one embodiment.

FIG. 6 illustrates an activity template submission workflow, according to an embodiment of the disclosure. In illustration 600, the computing devices may receive the input from the user device as part of the activity template submission workflow. The computing device may correspond with the backend computing device 106 and the management module 109 in FIG. 1, in some examples.

The activity template submission workflow may accept various input. For example, the computing device may accept one or more identifiers (e.g., workflow identifier, zone identifier, etc.), one or more activity template groups that correspond with a particular mobile drive unit and user input associated with an input template, and/or one or more activity templates that have been previously defined by users through the user interface. In some examples, the input template may accept direct input specifying subset of drives. In some examples, the activity template may accept parameters for each activity in the activity template (e.g., firmware version, etc.).

In some examples, the computing device may bind the input received for an input template to an activity template in the activity template submission workflow process. The computing device may also store status updates of the mobile drive units with the system in a data store. Once the input is found to the activity template, the computing device may determine a configurable electronic instruction of steps to submit to the mobile drive unit or corresponding management module. In some examples, the management module may act as a buffer for receiving electronic instructions for the mobile drive units (e.g., a mobile drive unit scheduling service, KSS, etc.).

In some examples, the activity template submission workflow may enable a first user input corresponding with an input template to be copied or propagated to other templates. The computing device may, for example, bind the input to other activities, or may bind the activities to other input. In some examples, the activity template submission workflow may articulate the relationship between one or more mobile drive units and user input and/or activities.

The state store may store status information in association with one or more mobile drive units and activity templates. In some examples, the system may generate and store identifiers in association with the status of the mobile drive units and activities.

Figure 7:
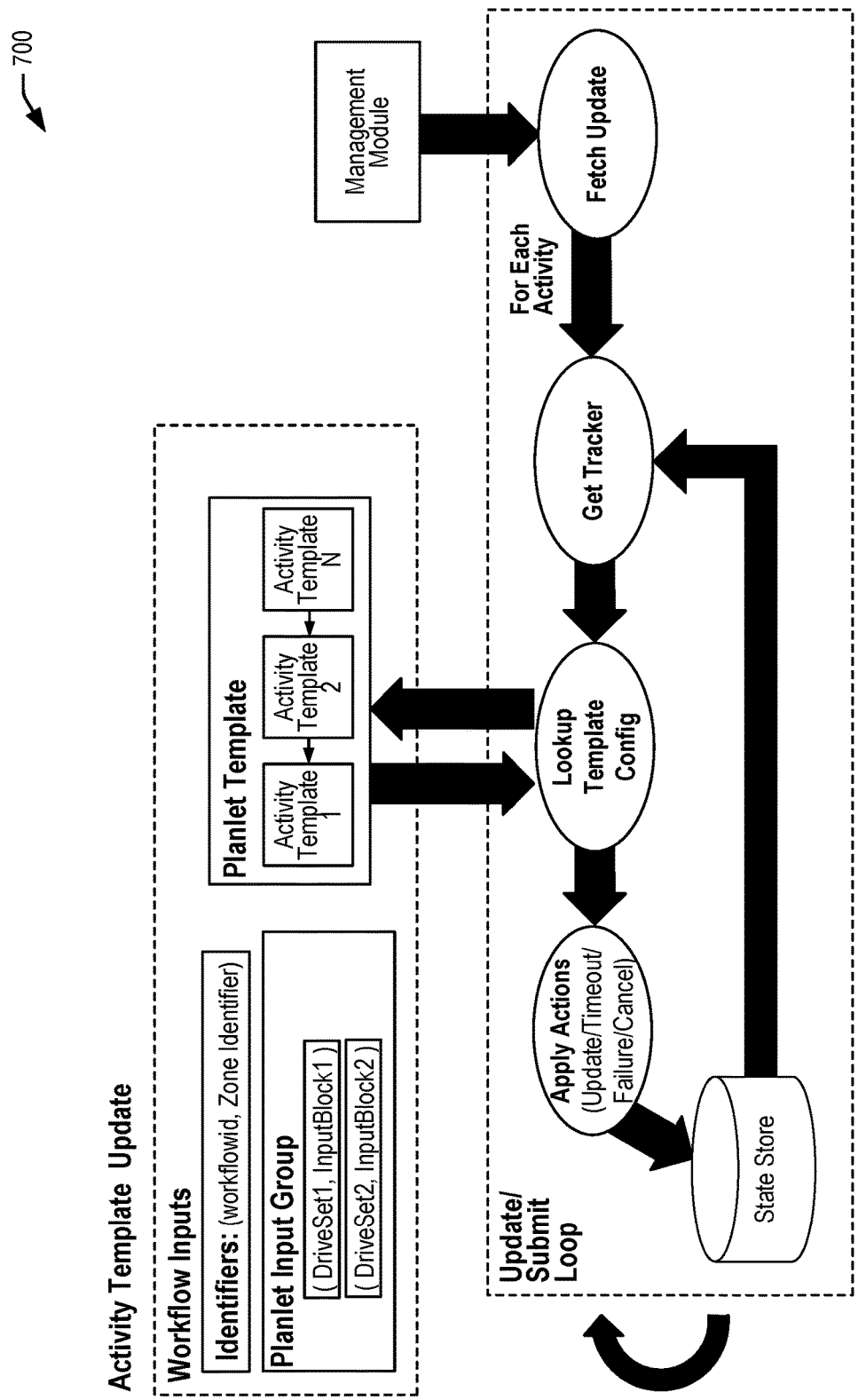
FIG. 7 illustrates an activity template update, in accordance with at least one embodiment.

FIG. 7 illustrates an activity template update, in accordance with at least one embodiment. In illustration 700, the computing device may receive the input from the user device and look up activity template information in response to the input. The computing devices may correspond with the backend computing device 106 and the management module 109 in FIG. 1, in some examples.

The system may access and provide the latest status of the actual execution of one or more mobile drive units in response to the configurable electronic instructions via the user interface. For example, the management module may retrieve current status information via a fetch update command. The management module may transmit the status data of one or more mobile drive units to the computing device. The computing device may correlate the identifier received from the management module with additional information corresponding to an identifier stored with the scheduling service data store. Additional information may be added in association with any additional data identified from the scheduling service data store. The information from the management module and the additional information may be provided via the user interface.

Figure 8:
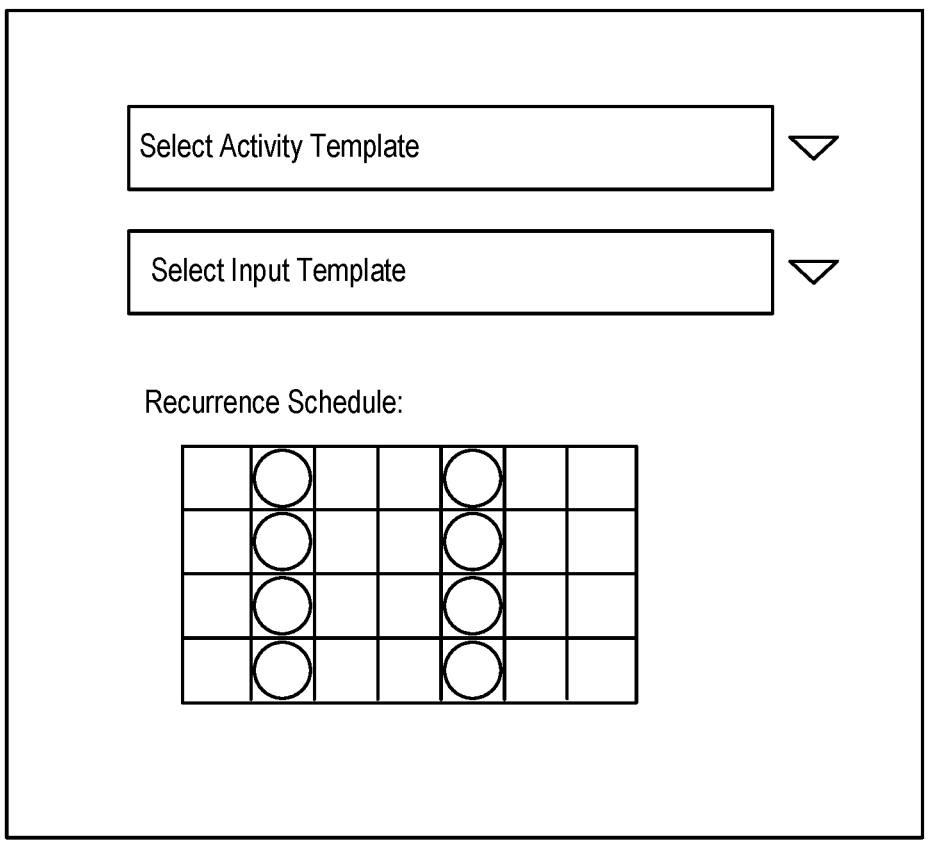
FIG. 8 illustrates a sample user interface for scheduling a reoccurring activity, in accordance with at least one embodiment.

FIG. 8 illustrates a sample user interface for scheduling a reoccurring activity, in accordance with at least one embodiment. For example, the computing device may present a list of available activity templates and a list of available input templates via a user interface 800. The user may select an activity template and corresponding input template. A selection of the schedule for implementing the activity with corresponding inputs may also be initiated. For example, the reoccurring activity may occur every Monday and Thursday of the week, as one illustration.

Figure 9:
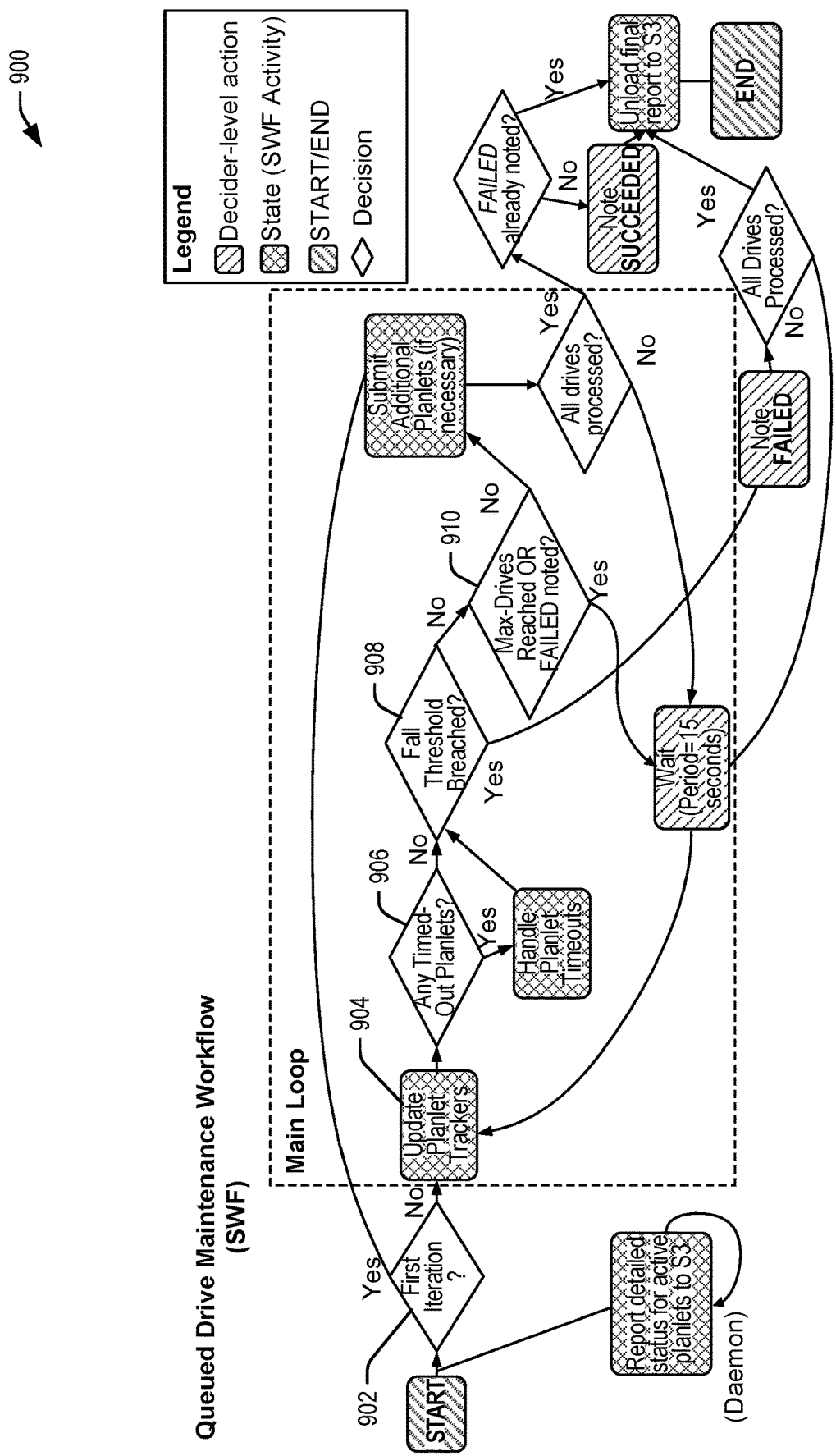
FIG. 9 illustrates an illustrative queued drive maintenance workflow, in accordance with at least one embodiment.

FIG. 9 illustrates an illustrative queued drive maintenance workflow, in accordance with at least one embodiment. A backend computing device may perform one or more features of illustration 900 for instructing mobile drive units in association with a maintenance process. The backend computing device may implement a loop of processing that may be initiated and/or repeated as part of the maintenance process workflow.

The process may correspond with a simple workflow service (SWF) activity or may be performed irrespective of SWF. SWF may not be required in some embodiments. In some examples, the SWF may help developers build, run, and scale background jobs that have parallel or sequential steps. SWF may correspond with a fully-managed state tracker and task coordinator executed at the backend computing device.

At step 902, the system may determine whether the loop is in the first iteration to help determine information that may be added to a detailed status report of operations performed by one or more mobile device units. When the system is implementing the first iteration, the system may submit additional templates if necessary. When the system is not implementing the first iteration, at step 904, a tracking of activity template processes (e.g., a planlet tracker) may be updated and/or added to the detailed status report. In some examples, the activity template tracker is a runtime analog of the activity template. In some examples, the system may receive a third input corresponding with a runtime configuration of the electronic instruction.

As a sample illustration, the system may receive a new activity template with four activities for the mobile drive unit to perform. The system may identify all of the mobile drive units at a particular time to determine which mobile drive units are available for maintenance activities. For each mobile drive unit and activity set, the system may track the location and or status of the activity in relation to the drive.

The system may also identify any errors. The errors may include, for example, whether any activity templates have timed out 906 or have exceeded a predetermined amount of time for completing an activity, or whether it be critical threshold has been breached 908. In some examples, a maximum number of mobile drive units may be predetermined and stored with the backend computing device 910. When the maximum number of mobile drive units has been reached that correspond with the failure, the system may identify the failure status. In some examples, the system may wait for a predetermined amount of time before submitting additional activity instructions (e.g., post-mortem workflow, auxiliary workflow, cancelation instruction, etc.).

Upon exit of the loop of activities, the system may determine whether all mobile drive units are processed. The mobile drive units may not be processed when an error has been found in the system may be forced to exit the predetermined activities identified by the activity templates or error rules. A final status report may be transmitted to identify this information.

Figure 10:
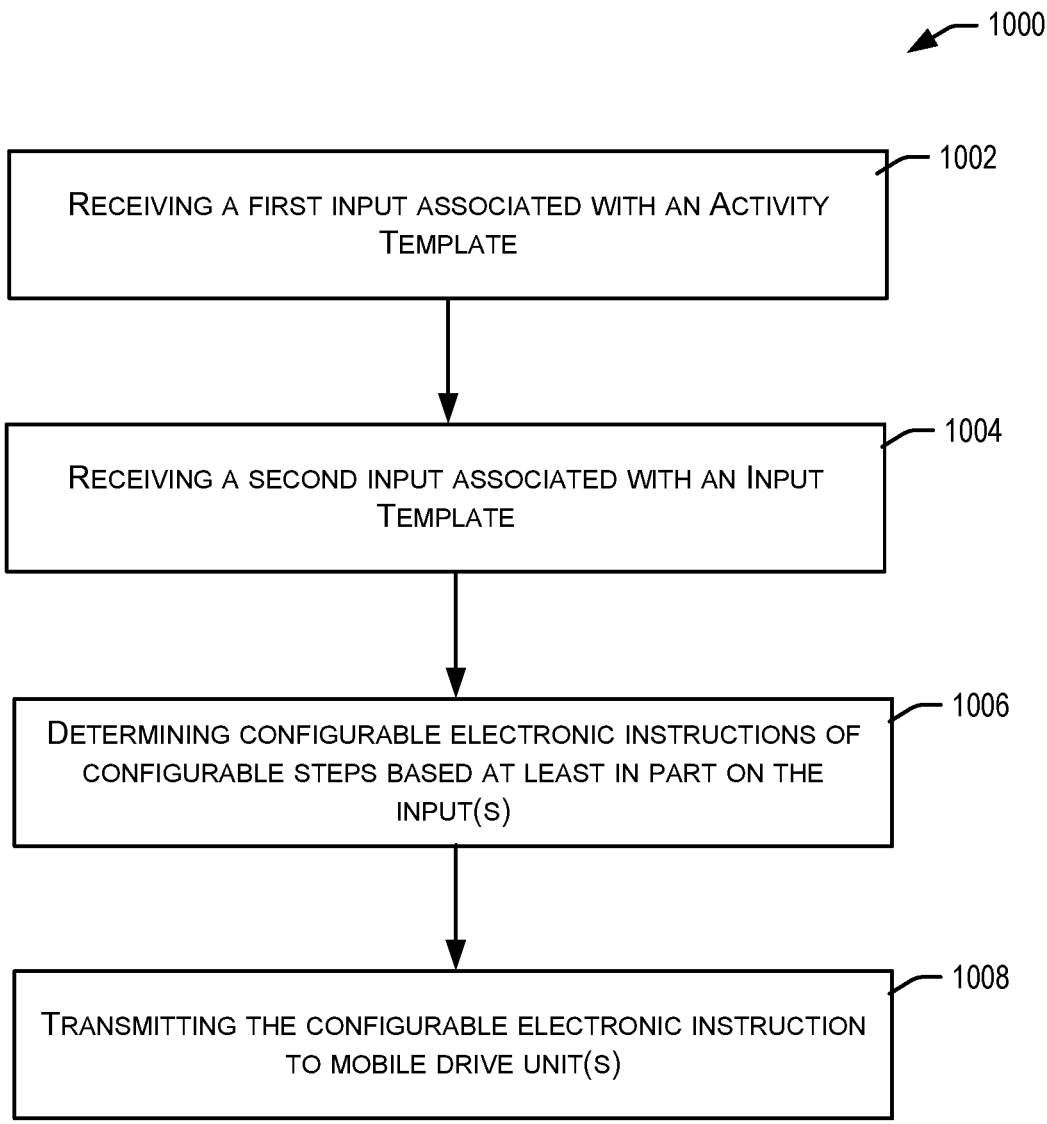
FIG. 10 illustrates an example flow diagram for providing generic maintenance activity scheduling described herein, according to at least one example.

FIG. 10 illustrates an example flow diagram for providing generic maintenance activity scheduling described herein, according to at least one example. In some examples, the backend computing device 106 (e.g., utilizing at least one of the template module 236, the threshold module 238, the monitor module 240, the command drive module 242, the feedback module 244, and/or the validation module 246), user device 104, management module 109, or mobile drive unit 114 shown in FIG. 1 may perform the process 1000 of FIG. 10.

Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1000 may begin at 1002 by receiving a first input associated with an activity template. The activity template may correspond with a configurable step or steps performed by the plurality of mobile to drive units of a physical workspace.

In some examples, the computing device may present a user interface that comprises a plurality of fields for accepting user input prior to receiving the input. For example, the computing device may present a user interface that comprises a plurality of fields. At least one field may be associated with user input for defining a maintenance process for the plurality of mobile drive units of a physical workspace. The maintenance process may be defined through a configuration of an activity template and an input template.

In some examples, the computing device may correlate failure rules with the activity template based at least in part on the first input. For example, the first input may comprise a particular step that may correspond with a potential for failure (e.g., the drive may not be able to enter a particular physical location, the drive may not be accessible or operable, etc.). The computing device may correlate one or more additional steps with the activity template that may programmatically check for the potential of failure associated with the activity. In some examples, the correlation of failure rules may be automatic and without additional instruction from the user device.

At 1004, the computing system may receive a second input associated with input template. The input template may correspond to the activity template. The input template may identify information associated with one or more steps of the activity including, for example, a selection of a subset of the plurality of mobile drive units.

At 1006, the computing system may determine a first configurable electronic instruction of configurable steps based at least in part on the first input and/or the second input. In some examples, the configurable electronic instruction may correspond with the identified subset of the plurality of mobile drive units.

At 1008, the computing system may transmit the configurable electronic instruction to the mobile drive units. In some examples, the computing device may include the failure rules corresponding with the activity template with the transmission of the configurable electronic instruction.

In some examples, the computing device may reuse the templates in association with new input. For example, the computing device may receive third input associated with an input template. The third input may correspond with a second configurable electronic instruction of the configurable steps performed by the subset of the plurality of mobile drive units. The computing device may transmit the second configurable electronic instruction with the original failure rules to the mobile drive units. The same failure rules may be transmitted because the activity template may be reused with a new input template in this example.

Figure 11:
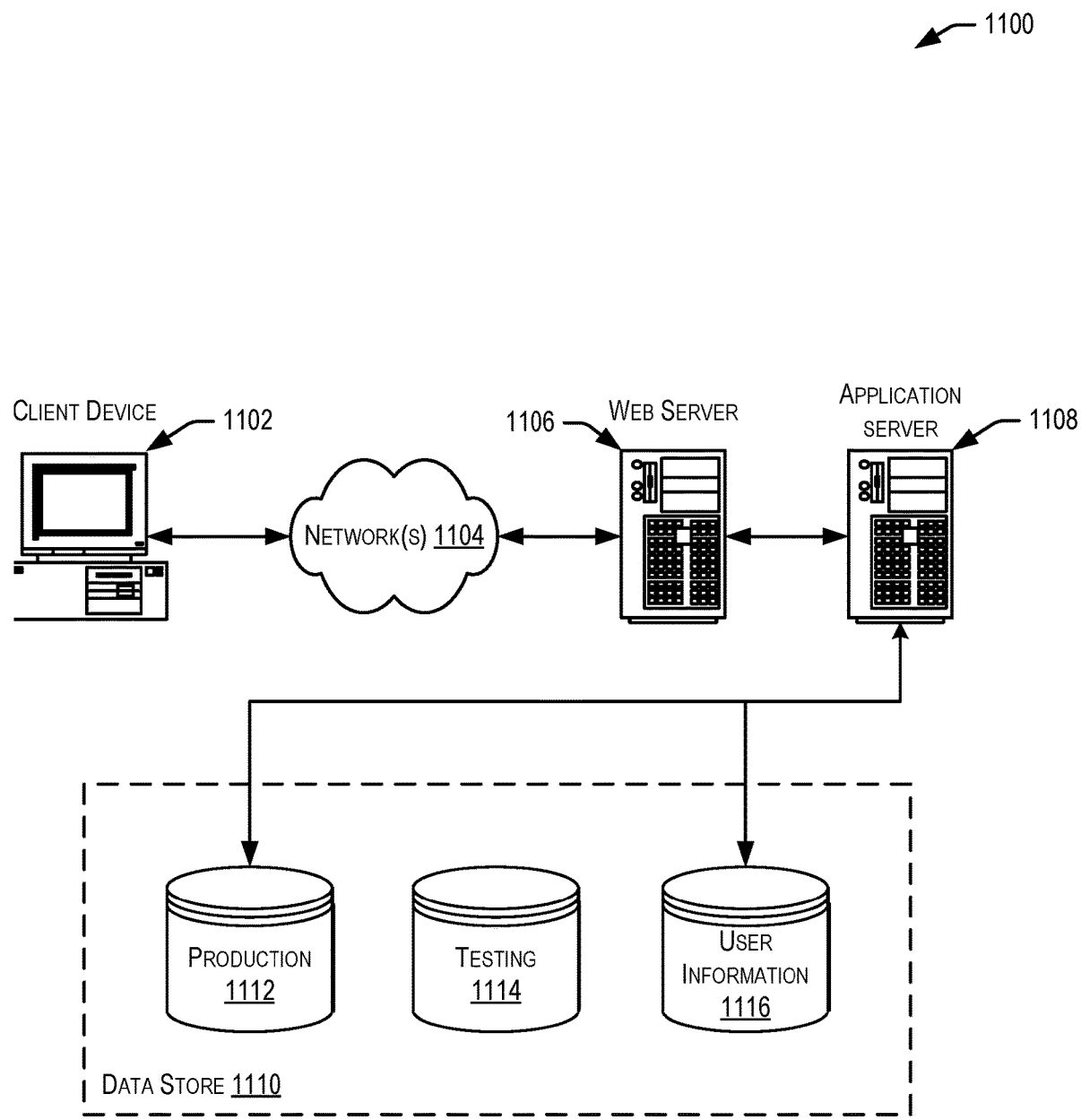
FIG. 11 illustrates an environment in which various embodiments can be implemented.

FIG. 11 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server.

It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    presenting, by a computing device, a user interface that comprises a plurality of fields associated with user input about a maintenance process for a plurality of mobile drive units of a physical workspace, the maintenance process to be defined through a configuration of an activity template and an input template that are stored separately, the activity template comprising a maintenance activity, and the input template comprising a configuration for the maintenance activity;
    receiving, by the computing device based at least in part on a first field of the plurality of fields of the user interface, first user input to the activity template, the activity template corresponding with configurable steps supported by the plurality of mobile drive units of the physical workspace, the first user input indicating the maintenance activity that corresponds to at least one of the configurable steps;
    automatically correlating, by the computing device, failure rules with the activity template based at least in part on the first user input;
    receiving, by the computing device based at least in part on a second field of the plurality of fields of the user interface, second user input to the input template, the input template corresponding to the activity template, and the second user input comprising a selection of a subset of the plurality of mobile drive units and indicating the configuration of the maintenance activity for the subset of the plurality of mobile drive units;
    determining, by the computing device, a first configurable electronic instruction of the configurable steps based at least in part on correspondence between the first user input and the second user input and the activity template; and transmitting, by the computing device, the first configurable electronic instruction and the failure rules to the subset of the plurality of mobile drive units.

2. The computer-implemented method of claim 1, further comprising:
receiving, by the computing device, third user input associated with the input template, the third user input corresponding with a second configurable electronic instruction of the configurable steps; and
transmitting, by the computing device, the second configurable electronic instruction and the failure rules to the subset of the plurality of mobile drive units, the failure rules corresponding with the activity template based at least in part on the first user input.

3. The computer-implemented method of claim 1, wherein transmitting the first configurable electronic instruction comprises:
instructing the subset of the plurality of mobile drive units to move to a first location;
enabling acceptance of a component upgrade; and
further instructing the subset of the plurality of mobile drive units away from the first location.

4. The computer-implemented method of claim 1, wherein receiving the second user input comprises:
receiving the selection of the subset of the plurality of mobile drive units as a first selection from multiple available selections defined by the input template, wherein the multiple available selections comprise a second selection about at least one of a firmware version or sensor calibration settings as the configuration of the maintenance activity.

5. A computing device, comprising:
a memory configured to store computer-executable instructions; and
a processor in communication with the memory configured to execute the computer-executable instructions to at least:
present a user interface that comprises at least one field about a maintenance process for a plurality of mobile drive units of a physical workspace, the maintenance process defined through a configuration of an activity template and an input template that are stored separately, the activity template comprising an activity, and the input template comprising a configuration for the activity;
receive, based at least in part on the user interface, first user input to the activity template, the activity template corresponding with configurable steps performed by the plurality of mobile drive units of the physical workspace, the first user input indicating the activity that corresponds to at least one of the configurable steps;
receive, based at least in part on the user interface, second user input to the input template, the input template corresponding to the activity template, and the second user input comprising a selection of a subset of the plurality of mobile drive units and indicating the configuration of the activity for the subset of the plurality of mobile drive units;
determine a first configurable electronic instruction of the configurable steps performed by the subset of the plurality of mobile drive units, the first configurable electronic instruction determined based at least in part on correspondence with the first user input and the second user input; and
transmit the first configurable electronic instruction to the subset of the plurality of mobile drive units.

6. The computing device of claim 5, wherein the processor is configured to execute further computer-executable instructions to at least:
automatically correlate failure rules with the activity template based at least in part on the first user input; and
transmit the failure rules to the subset of the plurality of mobile drive units.

7. The computing device of claim 5, wherein the processor is configured to execute further computer-executable instructions to at least:
receive a status update associated with the first configurable electronic instruction of the configurable steps performed by the subset of the plurality of mobile drive units.

8. The computing device of claim 7, wherein the status update initiates a root cause determination process.

9. The computing device of claim 7, wherein the processor is configured to execute further computer-executable instructions to at least:
upon receiving the status update, increment an error rating.

10. The computing device of claim 7, wherein the processor is configured to execute further computer-executable instructions to at least:
upon receiving the status update, determine an error rating of a step performed by the subset of the plurality of mobile drive units;
compare the error rating with a critical threshold; and
transmit a cancelation instruction to the subset of the plurality of mobile drive units when the error rating exceeds the critical threshold.

11. The computing device of claim 10, wherein the processor is configured to execute further computer-executable instructions to at least:
when the error rating exceeds the critical threshold, initiate a post-mortem workflow.

12. One or more non-transitory computer-readable storage media collectively storing computer-executable instructions that, when executed by one or more computer systems, configure the one or more computer systems to collectively perform operations comprising:
receiving a definition of a maintenance process for a plurality of mobile drive units of a physical workspace, the maintenance process defined through a configuration of an activity template and an input template that are stored separately, the activity template comprising a maintenance activity, and the input template comprising a configuration for the maintenance activity;
receiving first user input to the activity template, the activity template corresponding with configurable steps performed by the plurality of mobile drive units of the physical workspace, the first user input indicating the maintenance activity that corresponds to at least one of the configurable steps;
receiving second user input to the input template, the input template corresponding to the activity template, and the second user input comprising a selection of a subset of the plurality of mobile drive units and indicating the configuration of the maintenance activity for the subset of the plurality of mobile drive units;
determining a first configurable electronic instruction of the configurable steps performed by the subset of the plurality of mobile drive units, the first configurable electronic instruction determined based at least in part on correspondence with first user input and the second user input; and transmitting the first configurable electronic instruction to the subset of the plurality of mobile drive units.

13. The one or more non-transitory computer-readable storage media of claim 12, wherein the plurality of mobile drive units are operable independently from the first user input and the second user input.

14. The one or more non-transitory computer-readable storage media of claim 12, the operations further comprising:
transmitting a status of operation to a user interface; and
presenting the status of operation on the user interface.

15. The one or more non-transitory computer-readable storage media of claim 14, wherein presenting the status comprises identifying completed activities associated with the activity template.

16. The one or more non-transitory computer-readable storage media of claim 12, wherein an activity identified in the activity template is a credential rotation.

17. The one or more non-transitory computer-readable storage media of claim 12, the operations further comprising:
determining a second configurable electronic instruction of the configurable steps performed by the subset of the plurality of mobile drive units;
determining a first time range for the first configurable electronic instruction and a second time range for the second configurable electronic instruction; and
transmitting the second configurable electronic instruction, wherein the mobile drive units are able to perform the first and second configurable electronic instructions at the first and second time ranges, respectively.

18. The one or more non-transitory computer-readable storage media of claim 17, the operations further comprising:
receiving feedback for a status of the maintenance activity; and
adjusting the first time range or the second time range based at least in part on the feedback.

19. The one or more non-transitory computer-readable storage media of claim 12, the operations further comprising:
upon transmitting the first configurable electronic instruction to the subset of the plurality of mobile drive units, receiving data indicating actions performed by the subset of the plurality of mobile drive units for a predetermined period of time after an execution of the first configurable electronic instruction on the subset of the plurality of mobile drive units;
determining a status update based at least in part on a subsequent action.

20. The one or more non-transitory computer-readable storage media of claim 12, the operations further comprising:
receiving, at a first time from a first subset of the plurality of mobile drive units, a first status of an execution of the first configurable electronic instruction; and
receiving, at a second time from a second subset of the plurality of mobile drive units, a second status of the execution of the first configurable electronic instruction.

* * * * *